United States Patent [19]

Lois

[11] 4,076,190
[45] * Feb. 28, 1978

[54] APPARATUS FOR EXTRACTING ENERGY FROM WINDS AT SIGNIFICANT HEIGHT ABOVE THE SURFACE

[76] Inventor: Lambros Lois, 6104 Dunleer Court, Bethesda, Md. 20034

[*] Notice: The portion of the term of this patent subsequent to Dec. 9, 1992, has been disclaimed.

[21] Appl. No.: 671,944

[22] Filed: Mar. 30, 1976

[51] Int. Cl.² .......................... B64C 31/06; F03D 9/02
[52] U.S. Cl. ................................. 244/153 R; 290/55
[58] Field of Search .............. 244/153 R, 33, 155 R, 244/155 A, DIG. 1, 145; 290/54, 55, 43, 44; 73/189, 170 A

[56] References Cited

U.S. PATENT DOCUMENTS

| | | | |
|---|---|---|---|
| 1,609,569 | 12/1926 | Nakata | 244/153 R |
| 2,486,158 | 10/1949 | Haas | 244/153 R X |
| 2,520,704 | 8/1950 | Wisney | 244/153 R |
| 3,131,894 | 5/1964 | Jalbert | 244/145 |
| 3,228,635 | 1/1966 | Hughes et al. | 244/145 |
| 3,393,885 | 7/1968 | Neumark | 244/145 |
| 3,924,827 | 12/1975 | Lois | 244/153 R |
| 3,987,987 | 10/1976 | Payne et al. | 244/153 R |

Primary Examiner—Barry L. Kelmachter
Attorney, Agent, or Firm—George J. Neilan

[57] ABSTRACT

A buoyant sail or wing tethered to a line an appreciable distance above the surface where the winds are at higher speed than at ground level is provided with wind velocity gradient sensing members to guide movement of the buoyant sail to the elevation of greatest wind velocity, the other end of the line is attached to an electric generator. A series of sails are utilized with one being retracted while at least one other sail is positioned to catch the wind away from the generator. The wings may have dividers to increase the amount of flow disruption of the wind and increase the drag coefficient and hence the amount of energy extracted, and a pulley system may be utilized in lieu of a single pass tether line.

7 Claims, 6 Drawing Figures

APPARATUS FOR EXTRACTING ENERGY FROM WINDS AT SIGNIFICANT HEIGHT ABOVE THE SURFACE

BACKGROUND OF THE INVENTION

The present invention relates to apparatus for extracting energy from the wind. More particularly, the present invention is concerned with improvements in apparatus which utilizes a sail or wing which may be buoyant in its own right or which may be carried aloft by the configuration of the sail. The sail is designed to be carried to a relatively high altitude of several hundred feet above the surface of the earth where the wind velocity is considerably greater than close to the surface and consequently the wind's energy density is higher. The wings are disposed at the end of a tethered line for the power transmission and/or for controlling the orientation and relative position of the sails. Such apparatus does not require the use of a mast or large supporting tower as is the case with most propeller type windmills.

Apparatus of the general type described above is disclosed and claimed in my U.S. Pat. No. 3,924,827 issued Dec. 9, 1975. The present invention relates to improvements in the basic invention covered by my patent.

My patented invention employs a series of sails which may be comprised of a hollow buoyant body filled with a lighter than air gas. The buoyant sail has a concave surface facing the incoming wind and is designed to lift with it the necessary tether line leading from the body to the ground level structure which might include an electric generator. The sails are employed in series with the sails alternately being played out under the influence of the wind and then drawn back while presenting a smaller effective surface to the wind. The tether and/or power transmission lines may be attached at their lower end to pulleys which through suitable shaft and gear arrangements are connected to appropriate energy utilization equipment such as an electrical generator. Control means are employed to automatically reverse the direction of movement of the wings both when the line is played out and when the line is retracted to a predetermined point. The wing may be filled with a lighter than air gas such as hydrogen or helium. The sail includes means to add or subtract the gas, for example, to make up for losses, to compensate for changes in atmospheric pressure, which would change the volume of the filler gas and therefore effect the sail's lifting capacity, to compensate in changes in volume of the gas due to changes in atmospheric temperature, and to make certain that the internal pressure of the filler gas is greater by a certain amount than the atmospheric pressure. Changes in the amount of filler gas may also result in changes in the height of the wing.

SUMMARY OF THE INVENTION

A primary object of the present invention is to provide an improved system for extracting energy in an economical manner from the wind at considerable distances above ground level without the necessity of providing a rigid connecting structure from the ground level to a desired altitude where higher velocity wind is present. Another object of the invention is to provide means for adjusting the height of the sail to a region of the maximum wind velocity. Another object of the invention is to maximize the wind resistance offered by the sail in order to increase the efficiency of the system in harnessing energy from the wind. Still another object of the invention is to provide a novel tether line arrangement operating on a pulley principle in lieu of a single pass line to each sail to increase the speed of the unwinding line and consequently the rotational speed of a pulley attached thereto while at the same time proportionally reducing the force applied to the line.

DETAILED DESCRIPTION OF THE INVENTION

Figure 1:
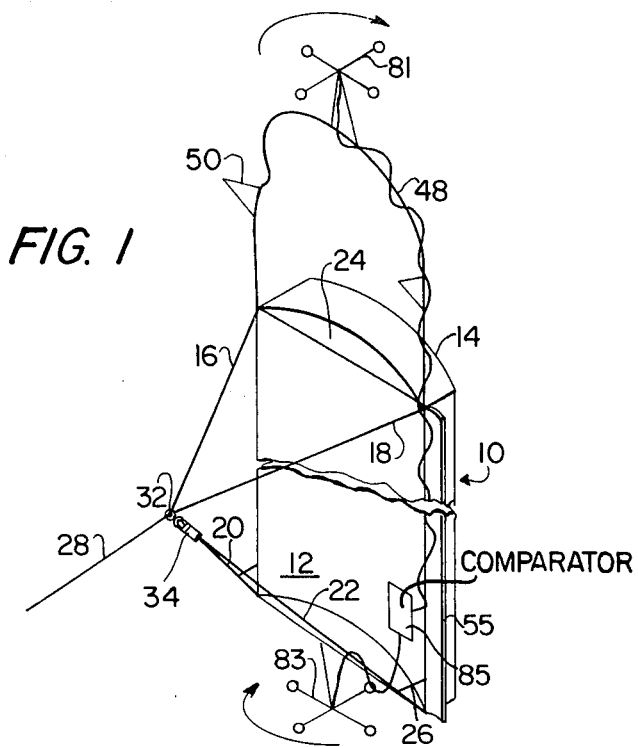
FIG. 1 is a perspective view of one embodiment of a buoyant sail in accordance with the invention having means to sense the vertical wind velocity gradient and to guide the sail to the optimum height for energy generation.

Referring now to the drawings and more particularly to FIG. 1, reference numeral 10 generally designates a floating, buoyant sail as described in my U.S. Pat. No. 3,924,827. This sail is hollow and is comprised of a gas impervious material such as plastic or the like and has concave surface 12 facing the wind and a convex rear surface 14. The sail is filled with a lighter than air gas such as hydrogen or helium so that it will rise of its own accord and take with it attached control and power transmitting lines 16, 18 and solid support members 20, and 22. Sail 10 is constructed in appropriate fashion to maintain the desired curved configuration, for example, sheets of plastic or the like of an arcuate configuration attached to the upper and lower peripheral surfaces of the sail to form end pieces 24, and 26. The end pieces serve to assist in forming a picket to catch the incoming wind and increase the drag coefficient of the sail. Lines 16 and 18 end in a ring 32 which is attached to support members 20 and 22 through an electromagnetic coupling device 34. A tether or control line 28 from the ground is also attached to ring 32. The wing when fully extended may reach a height of several hundred feet where the wind velocity is substantially greater than that at the surface and the wing may be several thousand feet downwind. By suitable adjustment of the length of the connecting line as well as the configuration of the wing, a desired resultant force can be achieved on the sail from the reaction of the wind upon the sail.

As described more fully in my above mentioned U.S. Pat. No. 3,924,827, a plurality of sails are used together with one or more sails in each system being played out while one or more sails are retracted and with the tether lines being wound on pulleys attached to an electrical generator. When a given sail is to be retracted, electromagnetic coupling 34 is opened so that the sail swings into a position presenting a smaller surface towards the wind and due to the shape of sail wind resistance will be lowered and consequently reduce the energy expended in retracting the sail. Since it is conceivable that an incoming sail may interfere with an outgoing sail, it is desirable to have the place of motion of two successive sails slightly different. This can be accomplished, for example, by attaching a side deflecting panel 55 to sail 10 which will develop a sideways force, and the succeeding sail may have a corresponding deflecting plane on the opposite side of the sail.

Above each sail there is a frame 48 with a hook-like extension 50 which is employed when the sail is fully retracted to reverse the direction of movement of the sail and start another cycle as explained more fully in my above mentioned patent. While the above brief description of the apparatus of my above mentioned patent is deemed sufficient to explain its operation, reference may be had to the text of said patent for a further description and for a description of details which are being omitted from the present specification as not essential to the present invention.

In accordance with the present improvements, an upper wind velocity measuring device 81 is mounted on the frame 48, and a lower wind velocity measuring device 83 is connected to the frame at the bottom of sail 10. Each measuring device comprises four arms disposed at right angles to each other and rotating about a vertical axis with circular enlargements at the ends thereof which when struck by the wind cause the measuring devices to rotate. The signals from both devices are passed to a comparator 85 which is mounted on sail 10. The signals from each device are proportional to the wind velocity at the respective end of the sail. If there exists a horizontal wind velocity gradient between the positions of measuring devices 81 and 83, the signals will be different and the comparator will activate control mechanisms to move the sail in the direction of the higher wind velocity. Such control means could be, for example, means for further inflating or deflating the floating sail via valves or pumps or a compressed lighter than air gas carried within the floating sail. Alternatively, an upper wing section such as that illustrated in FIG. 4 of my above mentioned patent may be provided. Such a wing section has provision for adjusting the angle of attack to vary the lift component and consequently changing the elevation of the sail structure. Consequently, the floating sail may be caused to assume the height of the maximum wind velocity and thus maximize the energy which may be extracted from the wind. When the wind velocity as measured by the two devices 81 and 83 are essentially equal, this will be sensed by the comparator and the control means will be deactivated until the differential in wind velocities between the two measuring devices reaches a predetermined magnitude which will reactivate the control means.

Figure 2:
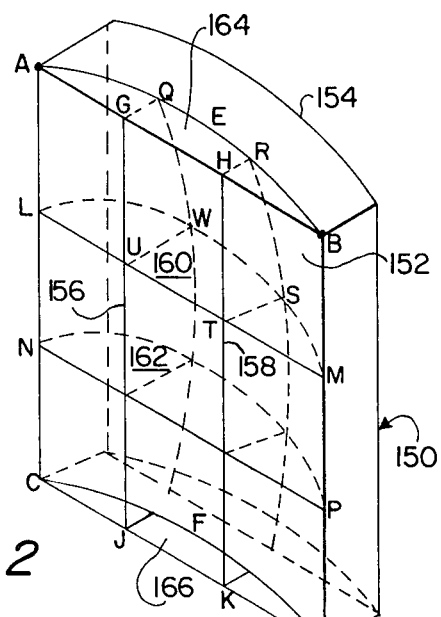
FIG. 2 is a perspective view of a buoyant sail per se provided with dividers to increase the wind resistance.

FIG. 2 illustrates a modified buoyant wing 150 per se with some parts omitted for the sake of clarity. This wing has a concave front 152 and a convex rear side 154. A pair (or more) of vertical partitions 156 and 158 intersect a pair (or more) of horizontal partitions 160 and 162 as well as joining each end to upper arcuate end member 164 and lower arcuate end member 166. This forms a grid pattern which increases the resistance of the sail. This resistance is expressed by the drag coefficient $C_D$ in the expression: $F = C_D \cdot q \cdot A$ where F is the force of the resistance of the sail coincident with the direction of the wind, $q$ is the stagnation pressure usually expressed as $\frac{1}{2} \rho u^2$ where $p$ is the air density and $u$ the wind velocity and A is the area of the sail in a direction perpendicular to the wind direction. Thus for a given $q$ and A, the force F can be increased by increasing the drag coefficient $C_D$. The use of the grid structure is based on the proposition that the drag coefficient $C_D$ will increase with the amount of flow disruption of the wind. The grid pattern of the dividers functions to increase the flow disruption of the wind and consequently the force applied to the sail.

Figure 4:
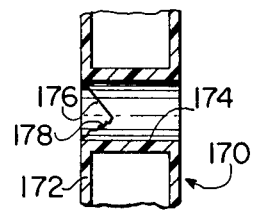
FIG. 4 is a cross-sectional view on an enlarged scale through one of the passageways of FIG. 3.
Figure 3:
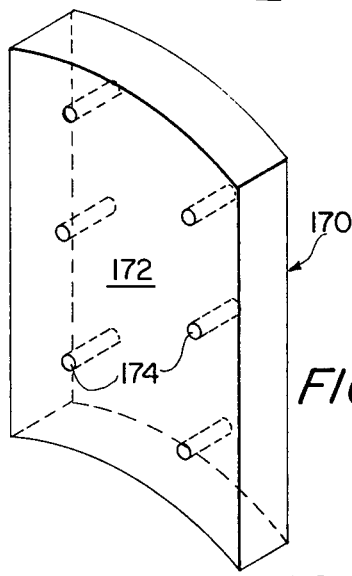
FIG. 3 is a perspective view of another embodiment of a buoyant sail per se having small passageways therethrough to alter the sail's resistance to the wind.

FIG. 3 illustrates another embodiment of a floating sail which is designed to alter the drag coefficient. A floating wing 170 of this embodiment has a concave wall 172 facing the wind and there are a plurality of small passageways 174 which extend through the entire thickness of the sail. Referring to FIG. 4, which is a transverse cross-section through a typical passageway 174, there is a small baffle or closure member 176 which normally closes off the passageway and which has its lower end attached to a spring 178. High winds may elongate spring 178 while pushing the closure to a more open position. The provision of the passageways through the sail may assist in stabilizing the sail particularly at high wind velocity.

Figure 5:
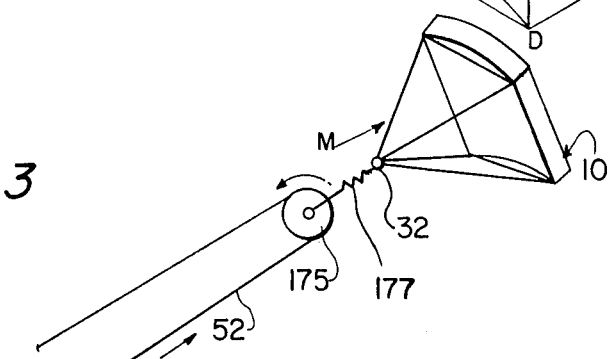
FIG. 5 is a somewhat diagrammatic view of an improved tether line system for a buoyant sail.

FIG. 5 illustrates another embodiment of the invention which has a modified tether line for connecting a floating sail 10 to a pulley 54 such as that of my U.S. Pat. No. 3,924,827 which pulley is connected via a gear system to an electrical generator. The tether or control line 52 passes outwardly from pulley 54 around a pulley 175 which is connected to the sail 10 via a spring 177. Line 52 has a second pass which doubles back to and is connected to a stationary point 179 adjacent pulley 54. As has been pointed out in my patent, the speed of the sail 10 will be about one-third of the speed of the wind for best power generation. This means that the sail will move fairly slowly. Thereofre, for the production of large amounts of power there will be large forces and slow rotating speeds for the pulley 54 if using a single pass tether line between the sail and the pulley as in my patent. By having basically a pulley arrangement with two passes of the tether line, the speed at which the line 52 is unwound will be twice that when a single line pulls the floating sail. The force applied to each pass of line 52 will be about half as great as when no pulley 175 is employed. Thus pulley 54 will rotate twice as fast and the reduced force will enable the gearing systems to be less bulky. There will be less need for a large diameter reduction gear. The electric generator is cheaper and operates more efficiently for a high rotational velocity shaft and for a given amount of power generation smaller reduction gears may be employed. Another benefit of the illustrated embodiment is that the line 52 need to be able to withstand only one-half of the maximum force. Such lines are cheaper and lighter per unit length. Also they are more flexible and can be wound on smaller diameter pulleys.

Figure 6:
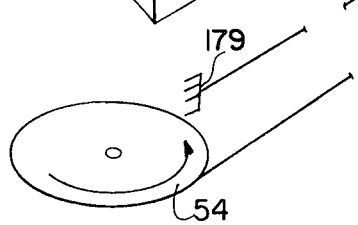
FIG. 6 is a view similar to FIG. 5 of another embodiment of a tether line system.
Figure 6:
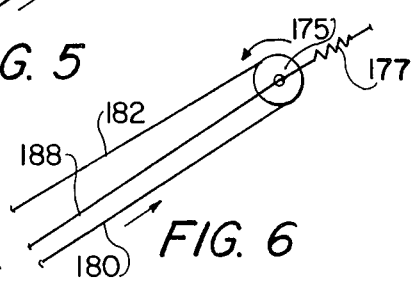

FIG. 6 illustrates an extension of the principle utilized in FIG. 5 to a tether line having three passes. A first pass 180 of the line extends from the ground pulley 54 around the pulley 175 connected to the wing. The second pass 182 of the line extends downwardly around a pulley 184 which is rotatable in fixed supports 186, and a third pass 188 extends upwardly back to the shaft and support for pulley 175 and is connected to the sail (not shown) by the spring 177. In this embodiment the force applied to each pass of the tether line is about one-third the value if there was a single pass of the tether line and similarly the velocity of the tether line and the rotational speed of pulley 54 is increased by three times.

Although presently preferred embodiments of the invention have been shown and described with particularity, it will be appreciated that various changes and modifications may suggest themselves to those of ordinary skill in the art upon being apprised of the present invention. Also the illustrated embodiments are intended to be illustrative and not limiting. Accordingly, it is intended to encompass all such changes and modifications as fall within the scope and spirit of the appended claims.

I claim:

1. In apparatus for harnessing energy from atmospheric winds, comprising at least one floating sail, each sail being connected to a flexible line, the other end of each flexible line being wound upon a respective pulley for utilizing energy extracted from the wind by playing out each said flexible line and each said sail under the influence of the wind, the improvement comprising wind velocity gradient sensing means for sensing the wind adjacent the upper and lower edges of said sail, comparator means to compare the signal from said sensing means and to provide an indication of the direction in which each sail should move to reach an altitude of highest wind velocity.

2. Apparatus according to claim 1, wherein said sensing means comprise a pair of sensor elements connected at opposite ends of said sail.

3. Apparatus according to claim 1, wherein said sail is provided with means to disrupt wind flow and increase wind resistance.

4. Apparatus according to claim 3, wherein said flexible line comprises a plurality of passes, and a pulley connected to said sail and engaged by said flexible line passes.

5. In apparatus for harnessing energy from atmospheric winds, comprising at least one floating sail, each sail being connected to a flexible line, the other end of each flexible line being wound upon a respective pulley for utilizing energy extracted from the wind by playing out each said flexible line and each said sail under the influence of the wind, the improvement comprising a pulley connected to each sail and moveable therewith, and said flexible line passing around said pulley and having at least one additional pass extending downwardly to a fixed point adjacent the respective pulley associated with the respective sail.

6. Apparatus according to claim 5, wherein said flexible line has two passes.

7. Apparatus according to claim 5, wherein said flexible line has three passes, and further comprising an additional pulley mounted adjacent the ground so that the first pass of said line extends outwardly to the pulley connected to said sail, the second pass of said line extends downwardly to said additional pulley, and the third pass of said line extends upwardly and is operatively connected to said sail.

* * * * *